Feb. 21, 1950     L. G. TUBBS ET AL     2,498,317
REMOTE INDICATING SYSTEM
Filed April 4, 1947     3 Sheets-Sheet 1
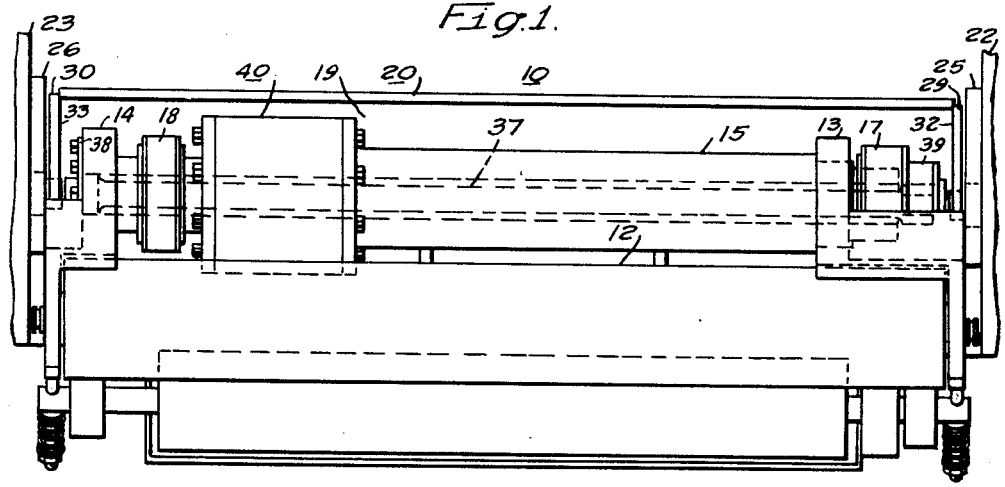
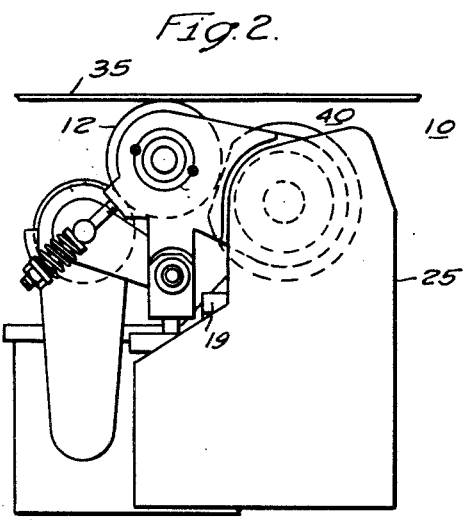
WITNESSES:
INVENTORS
Lester G. Tubbs and
Gerhard P. Lessmann.
ATTORNEY Feb. 21, 1950 L. G. TUBBS ET AL 2,498,317
REMOTE INDICATING SYSTEM
Filed April 4, 1947 3 Sheets-Sheet 2
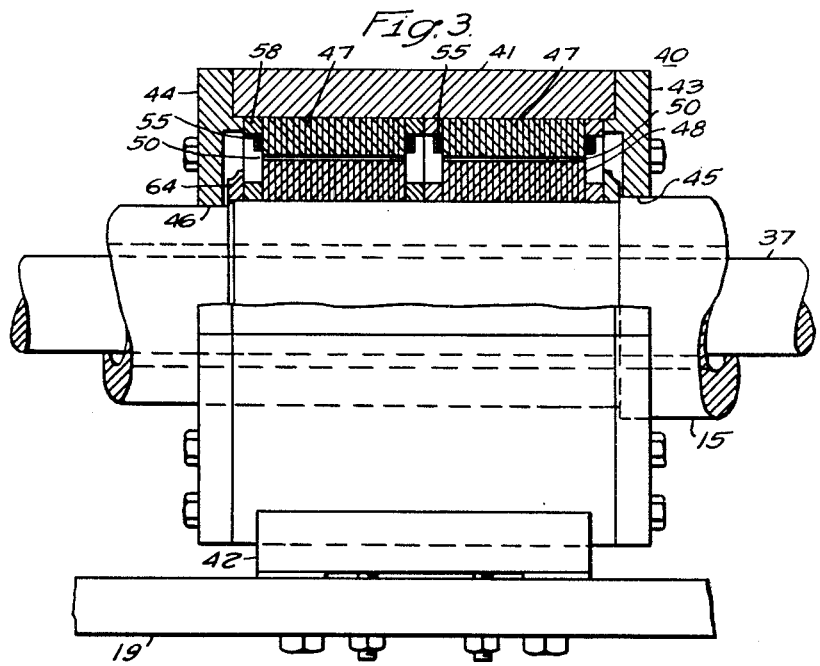
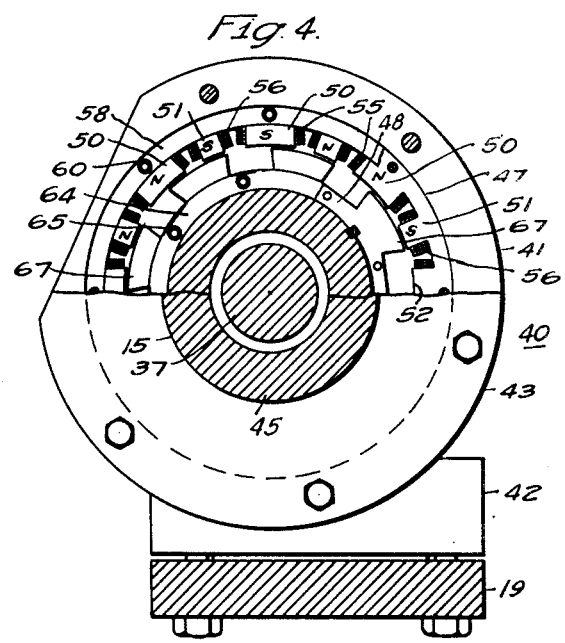
WITNESSES:
INVENTORS
Lester G. Tubbs and
Gerhard P. Lessmann.
ATTORNEY Feb. 21, 1950 L. G. TUBBS ET AL 2,498,317
REMOTE INDICATING SYSTEM
Filed April 4, 1947 3 Sheets-Sheet 3

WITNESSES:
INVENTORS
Lester G. Tubbs and
Gerhard P. Lessmann.
BY
ATTORNEY

Patented Feb. 21, 1950

2,498,317

UNITED STATES PATENT OFFICE 2,498,317

REMOTE INDICATING SYSTEM

Lester G. Tubbs and Gerhard P. Lessmann, Pittsburgh, Pa., assignors to Westinghouse Electric Corporation, East Pittsburgh, Pa., a corporation of Pennsylvania Application April 4, 1947, Serial No. 739,510

9 Claims. (Cl. 177—351)

Our invention relates, generally, to remote control systems, and it has reference, in particular, to remote indicating and control apparatus and systems suitable for use with tensioning devices, or the like.

Generally stated, it is an object of our invention to provide a remote indicating device and system for use with strip tensioning devices which shall be simple and inexpensive to manufacture, of rugged and compact construction and reliable and effective in operation.

More specifically, it is an object of our invention to provide for using a magnetic coupling device for translating movement of a tension roll of a strip tensioning device for indicating or regulating the tension of the strip.

Another object of our invention is to provide for utilizing a magnetic coupling device in a balance circuit for indicating movement of the tension roll of a strip tensioning device.

Yet another object of our invention is to provide a simple and compact position responsive device for indicating the operating position of the tension roll of a strip tensioning device.

It is also an object of our invention to provide for using an indicating device of the magnetic type in a bridge circuit for indicating the relative operating position of a strip tensioning device to provide a remote indication of the strip tension.

A further object of our invention is to provide for obtaining an indication of rotational movement on the order of 8°, such as may occur with strip tensioning devices.

It is an important object of our invention to provide a magnetic position indicator having a substantial linear output characteristic over a relatively wide operating range.

A yet further object of our invention is to provide a remote indicating device of the magnetic type which is not seriously affected by inaccuracies in the length of the air gap.

Still another object of our invention is to provide a tension indication device of the magnetic type which utilizes an air gap having a variable cross-sectional area, whereby the device is accurately responsive to movements of a greater degree than are possible with devices of the variable length air gap type.

Other objects will in part be obvious, and will in part be described hereinafter.

In practicing our invention in the form which is suitable for use with a strip tensioning device, a rotor of magnetic material having salient pole pieces is mounted on the rotatable fulcrum shaft of the strip tensioning device. The stator is provided with a plurality of alternately wide and narrow, inwardly projecting pole pieces which define a bore for receiving the rotor. The pole pieces of the stator are provided with windings, all the windings on the wide pole pieces being connected in series circuit relation, as are the windings on the narrow pole pieces. The two sets of windings are then connected across a center-tapped balance coil and an alternate current voltage is applied across the network. A meter connected intermediate the two sets of windings and to the center tap of the balancing coil indicates rotational movement of the fulcrum shaft as the tension roll is moved in response to changes in the tension of the strip.

For a more complete understanding of the nature and objects of our invention, reference may be made to the following detailed description which may be studied in connection with the accompanying drawings, in which:

Figure 1 is a plan view of a strip tensioning device embodying the invention in one of its forms;

Fig. 2 is an end elevational view of the strip tensioning device shown in Fig. 1;

Fig. 3 is an enlarged front elevational view, partly in section, of a portion of the tensioning device of Fig. 1, broken out in part to show details of the magnetic coupling device;

Fig. 4 is an enlarged end elevational view broken out in part of the coupling device shown in Fig. 3;

Figure 5:
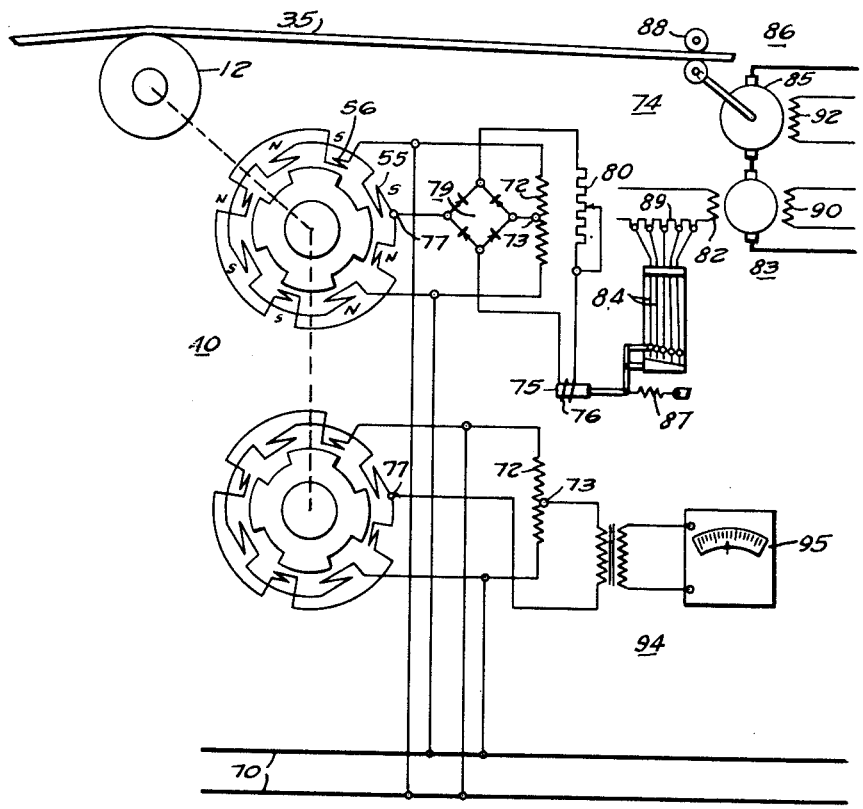
Fig. 5 is a diagrammatic view of a tension indicating and control system embodying the invention in one of its forms.

Referring to Figs. 1 and 2, the reference numeral 10 may denote, generally, a strip tensioning device of the type disclosed in the copending application of G. P. Lessmann, Serial No. 739,517. The device may comprise a tension roll 12 rotatably supported between spaced arms 13 and 14, projecting radially from a tubular fulcrum shaft 15. The fulcrum shaft may be rotatably supported by means of supports 17 and 18, secured to the base 19 of a balance structure support 20. The balance structure support 20 may be positioned between the sides 22 and 23 of a mill housing by means of side plates 25 and 26, having pivot pins 29 and 30 which project into openings in the ends 32 and 33 of the balance structure support 20.

The tension roll 12 may be biased against a length of strip material 35 by means of an elongated torque shaft 37 connected to the fulcrum shaft 15 at one end by means of a flange 38, and fixed against rotation on the other end in a socket 39, comprising a part of the support 17. In order to provide an indication of the operating position of the fulcrum shaft 15, means such as the indicating device denoted, generally, by the numeral 40, may be utilized.

Referring to Figs. 3 and 4, it will be seen that the indicating device 40 may comprise a cylindrical housing 41 provided with a base 42 for mounting on the base 19 of the balance structure support 20. Covers 43 and 44 may be provided at the opposite ends of the housing, having openings 45 and 46 for receiving the hollow fulcrum shaft 15. The indicating device 40 comprises in the present instance a pair of magnetic coupling devices each comprising a stator 47 and a corresponding rotor 48.

The stators may be positioned within the housing 41 and may comprise a plurality of ring-like laminations having inwardly projecting or salient pole pieces 50 and 51 equally spaced apart and defining a substantially uniform central bore 52. The pole pieces 50 may be substantially twice the peripheral width of the pole pieces 51 and may be positioned alternately therewith. Windings 55 and 56 may be provided on the pole pieces 50 and 51, respectively, for producing a magnetic flux.

The laminations may be secured in the housing 41 in any suitable manner, being, for example, positioned between end rings 58 and secured by means of rivets 60. Where only a single indicating or remote control device is desired, a single set of laminations may be utilized. A double set is shown in the present instance for providing both a remote indication of, and for controlling, the tension of the strip material.

In order to provide for obtaining an indication of the relative operating position of the tension roll 12, the rotors 48 may be mounted on the fulcrum shaft 15 in association with their respective stators. Each rotor may comprise a plurality of ring-like laminations of a magnetic material secured between end rings 64 by means of rivets 65. The laminations may be provided with projecting or salient pole pieces 67 at uniformly spaced intervals about the periphery. These pole pieces may be of such peripheral width and so positioned relative to the pole pieces 50 and 51 of the stator, that they extend from the leading tip of one pole piece 51 to the center of the adjacent pole piece 50 in the direction in which an indication of movement of the fulcrum shaft 15 is desired. For example, with the arrangement of the strip tensioning device shown in Figs. 1 and 2, the pole pieces 67 may extend from the leading tip of each pole piece 51 to the center of the adjacent pole piece 50 in a counterclockwise direction. The effective cross-sectional area of the air gap, which may be defined substantially by the overlapping portions of the pole pieces of the rotor and stator, will be varied upon movement of the rotor in a counterclockwise direction.

Referring to Fig. 5, it will be seen that the windings 56 on the narrow pole pieces are connected in series circuit relation with each other so as to provide a distributed winding, as are the windings 55 on the wide pole pieces. The two sets of connected windings are thereupon connected in series circuit relation across a suitable source of alternating current voltage represented by the conductors 70. A balance coil 72, having a center tap 73 may be connected in shunt circuit relation with the two sets of windings.

In order to provide for regulating the tension of the strip 35 which is engaged by the tension roll 12, and which may for the purposes of illustration be assumed to be moving from left to right, control means comprising a regulating device 74 may be provided, having an armature 75 and operating winding 76, which may be connected in a response circuit between the junction point 77 of the two sets of stator windings and the center tap 73 by means of a rectifier circuit 79 and a variable resistor 80 for changing the calibration thereof. The regulating device 74 may be utilized to control the operation of a roll motor, being for example, arranged to control the connection of a regulating field winding 82 of a booster generator 83 which may be connected in series circuit relation with the armature 85 of a motor 86 driving a set of rolls 88 between which the strip 35 passes. The armature 75 may be actuated against suitable biasing means 87 to actuate a plurality of flexible contact members 84 and progressively shunt more sections of a resistor 89 in circuit relation with the field winding 82. The main field winding 90 of the booster generator 83, and the field winding of the motor 86 may be connected to suitable sources of electrical energy. It will be realized that the regulating device 74 may instead be used to vary the energization of the motor field winding 92, if desired.

The winding 55 and 56 may be so arranged as to provide for making alternate ones of the wide pole pieces of the same polarity, and likewise with respect to the narrow pole pieces. The polarities of the adjacent pole pieces may therefore be such that one wide pole piece and its adjacent narrow pole piece will be of the same polarity and may be considered as portions of a common pole structure. The adjoining pairs of wide and narrow pole pieces on each side of said pole structure will be of the opposite polarity as shown by the indicia N and S in Figs. 4 and 5.

If the tension of the strip 35 increases, the tension roll 12 will be depressed, so that the rotor 48 will be moved in a counterclockwise direction. Accordingly, the area of each pole piece 67 opposite a small pole piece 51 of the stator will decrease, while the area of the pole piece 67 opposite the adjacent wide pole piece 50 increases. This causes the magnetic flux passing through all of the pole pieces 51 to be reduced, while that passing through the pole pieces 50 is increased. The distribution of the voltage drop across the windings 55 and 56 will therefore be no longer balanced, and an unbalance voltage will appear across the rectifier circuit 79. The operating winding 76 will be energized and the armature 75 of the regulating device 74 will be actuated to increase the energization of the regulating field winding 82 of the booster generator 83. The field winding 82 may be differential with respect to the field winding 90 so that the voltage of the booster generator is decreased. The voltage applied across the armature 85 of the motor 86 may thereby be decreased, so that the motor slows down and restores the tension of the strip 35 to the desired value. The tension roll 12 returns to its normal operating position and the differential voltage applied to the switch is reduced, whereupon the energization of the regulating field winding 82 will be restored.

The reference numeral 94 of Fig. 5 may denote, generally, a remote indicating system wherein an indicating meter 95 may be connected in a response circuit bridged relation between the junction point 77 of the windings of the second magnetic coupling device and the center tap 73 of its associated balance coil 72. The unbalanced voltage between the points 73 and 77 will be substantially proportional to the displacement of the tension roll 12 from its free position, whereby this indication may be read at a distance on a meter 95.

Figure 6:
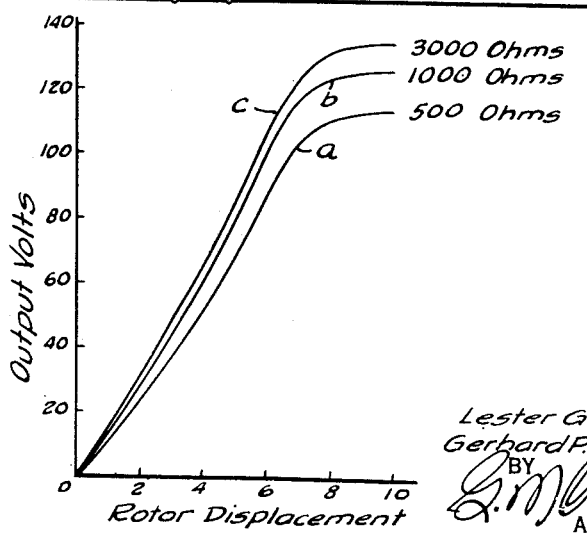
Fig. 6 shows a set of calibration curves illustrating the operating characteristics of the magnetic coupling device.

Referring to Fig. 6, the curves *a*, *b* and *c* represent calibration curves of a magnetic coupling device embodying the features of our invention, for different values of load resistance. In this instance the loads comprised 500, 1000, and 3000 ohms, respectively, with 110 volts 60 cycle alternating current applied to the circuit in which the coupling device is connected. It will be apparent that the coupling device embodying the features of our invention has a substantially linear characteristic over a wide operating range so that the unbalance voltage is substantially directly proportional to the rotational displacement of the rotor for a varied range of loads and over a wide operating range.

From the above description and the accompanying drawings, it will be apparent that we have provided remote position indicating apparatus and an indicating and control system embodying the invention which is simple and inexpensive to manufacture and is reliable in operation. A remote indicating device of the nature herein described, is relatively uneffected by variations in manufacturing tolerances, since it does not rely on variations in the length of the relatively short air gap between the rotor and the stator. Instead, apparatus embodying our invention operates on the variation in the effective cross-sectional area of an air gap. Since the two sets of windings are each distributed around the entire periphery in alternate relation, eccentricities in the air gap are substantially compensated for, and do not appreciably effect the resultant division of voltage between the two sets of windings. A device of the type embodying our invention is responsive to relate movement over a wide operating range since it is not limited by permissible variations in air gap length.

While our invention has been described in detail in the form which is suitable for use with strip tensioning devices, it is to be understood that it is not so limited in use and may be applied to other devices of a similar nature.

Since certain changes may be made in the above described construction and different embodiments of the invention may be made without departing from the spirit or scope thereof, it is intended that all the matter contained in the above description and shown in the accompanying drawings shall be considered as illustrative and not in a limiting sense.

We claim as our invention:

1. The combination with a strip tensioning device having a roll supported by a fulcrum shaft for bearing against a strip material, of control means including a stator of magnetic material and a rotor of magnetic material positioned in spaced relation therewith and movable with the roll to vary the effective cross-sectional area of the air gap between the rotor and the stator, circuit means including a plurality of distributed windings connected to a source of electrical energy to provide magnetic poles of alternate polarity about the stator for providing a magnetic flux in the air gap, and control means responsive to changes in impedance of the circuit means, said control means being connected intermediate said distributed windings.

2. Position responsive means for a movable roll disposed to bear against a strip material comprising, a stator of magnetic material having a bore defined by a plurality of spaced pole pieces provided with windings, a rotor of magnetic material positioned within the bore and having a plurality of pole pieces positioned in predetermined relation to the pole pieces of the stator, said rotor being rotatable with movement of the roll to vary the effective cross-sectional area of the air gap between the pole pieces of the rotor and stator, circuit means connecting the windings on the pole pieces to a source of alternating current in series circuit relation, a voltage divider connected in shunt relation with said windings, and response means connected between intermediate points of the windings and the voltage divider responsive in accordance with the position of the roll.

3. The combination with a movable roll of a stator having a ring-like core of magnetic material with a plurality of pole pieces defining an axial bore, said pole pieces having windings thereon, circuit means connecting alternate ones of said windings to provide two sets of windings, said sets being connected in series circuit relation to a source of alternating current for producing a magnetic flux, a rotor of magnetic material rotatable with movement of the roll positioned concentrically with the bore, said rotor having a plurality of projecting pole pieces defining with the pole pieces of the stator air gaps of which the cross-sectional area varies with rotation of the rotor relative to the stator, a voltage divider connected to said source, and a response circuit connected between intermediate points of the voltage divider and said windings.

4. In a position responsive transmitter, a ring-like stator of magnetic material having a plurality of inwardly projecting pole pieces equally spaced about the periphery, said pole pieces being alternately of different peripheral widths, a rotor of magnetic material having salient pole pieces defining with the stator pole pieces an air gap of substantially uniform radial length and variable cross-section as the rotor rotates about the axis of the stator, and excitation means on each of the stator pole pieces connected in series circuit relation to an alternating current source to produce a magnetic flux in the air gap between the rotor and stator, a voltage divider connected to the source, and a response circuit connected to intermediate points of the windings and the voltage divider.

5. The combination with a strip tensioning device having a movable roll disposed to bear against one side of a strip material, of a stator of magnetic material having a plurality of internal pole pieces defining a central bore and provided with windings, a rotor of magnetic material having a plurality of salient pole pieces, said rotor being positioned substantially concentrically of the bore to provide a substantially uniform air gap between the pole pieces and being rotatable in accordance with movement of the roll, circuit means connecting the windings to a source of alternating current, a voltage divider connected in shunt circuit relation with the windings, and a response circuit connected in bridging relation between the windings and said divider including control means responsive to the position of the roll.

6. In a position indicating system for a tensiometer roll supported from a rotatable fulcrum shaft for engaging a strip material in different operating positions depending on the strip tension, a rotor of magnetic material supported on the fulcrum shaft, said rotor having a plurality of salient pole pieces substantially concentric with the shaft, a stator of magnetic material having a bore defined by a plurality of substantially concentric pole pieces defining with the pole pieces of the rotor a substantially annular air gap, a circuit means including a plurality of windings on the stator pole pieces connected to a source of alternating current for producing a magnetic flux in the air gap, a voltage divider connected across said windings, and circuit means providing a bridge circuit including said circuit means, voltage divider and an indicating meter connected between the voltage divider and said windings to indicate the operating position of the tension roll.

7. In a position responsive system for a rotatable shaft, a rotor of magnetic material rotatable with the shaft and provided with a plurality of salient pole pieces, a stator of magnetic material having a plurality of inwardly projecting pole pieces defining a bore for receiving the rotor, the pole pieces of the stator being separated endwise from the pole pieces of the rotor substantially equidistant about the periphery, a winding on each of the stator pole pieces, the windings of alternate pole pieces being connected in series circuit relation, circuit means connecting the two sets of windings in series circuit relation to a source of alternating current, a center-tapped balance coil connected in shunt circuit relation with the two sets of windings, and control means comprising a response circuit responsive to the relative positioning of the rotor and stator pole pieces connected intermediate the two sets of windings and the center tap.

8. In a position responsive system for a movable roll for engaging a strip of material acted upon by rolls having a driving connection with a motor, a rotor of magnetic material having a plurality of pole pieces equally spaced about the periphery, said rotor being operatively connected to rotate with movement of said movable roll, a ring-like stator having a plurality of equally spaced inwardly projecting pole pieces in uniform endwise spaced relation with the rotor pole pieces and having windings, circuit means connecting the windings on alternate stator pole pieces in series circuit relation in two sets and connecting the two sets in series circuit relation with a source of control voltage, a balance coil connected in shunt circuit relation with the two sets of windings and having a center tap, and control means including a response circuit connected in a Wheatstone bridge circuit between a point intermediate the two sets of windings and the center tap operable to control the roll motor to vary the tension of the strip.

9. The combination with a rotatable shaft, of a rotor secured to the shaft comprising a ring of laminated magnetic material having equally spaced salient pole pieces about the periphery, a stator comprising a ring of laminated magnetic material having an equal number of similar pole pieces projecting inwardly and separated by a like number of pole pieces of lesser peripheral width, said inwardly projecting pole pieces defining a bore to receive the rotor with an air gap of substantially uniform length between the ends of the pole pieces, circuit means connected to a source of alternating current to produce a magnetic flux in the air gap including windings on the pole pieces of the stator, a voltage divider connected in parallel circuit relation with said windings, and a response circuit including response means operable in response to movement of the rotor connected in bridging relation between points in said windings and said voltage divider.

LESTER G. TUBBS.
GERHARD P. LESSMANN.

REFERENCES CITED

The following references are of record in the file of this patent:

UNITED STATES PATENTS

| Number | Name | Date |
|---|---|---|
| 1,120,615 | Harris | Dec. 8, 1914 |
| 1,718,494 | Schuring | June 25, 1929 |
| 2,054,945 | Nisbet | Sept. 22, 1936 |
| 2,255,601 | Schmitt | Sept. 9, 1941 |
| 2,275,192 | Bailey | Mar. 3, 1942 |
| 2,285,654 | Hanna | June 9, 1942 |
| 2,379,417 | Conrad | July 3, 1945 |
| 2,389,382 | Mikina | Nov. 20, 1945 |
| 2,415,819 | Halpert et al. | Feb. 18, 1947 |
| 2,419,979 | Wilson | May 6, 1947 |
| 2,420,539 | Hornfeck | May 13, 1947 |

FOREIGN PATENTS

| Number | Country | Date |
|---|---|---|
| 303,953 | Italy | Dec. 21, 1932 | wt-ngmtfaotherc05_ shrdlu cmfwyp shrdlu unn